United States Patent
Geislinger

(12) 
(10) Patent No.: US 6,168,527 B1
(45) Date of Patent: Jan. 2, 2001

(54) COUPLING COMBINATION OF A COMPENSATING COUPLING AND A TORSIONALLY ELASTIC COUPLING

(75) Inventor: Matthias Geislinger, Salzburg (AT)

(73) Assignee: Ellergon Antriebstechnik GmbH, Hallwang/Salzburg (AT)

(*) Notice: Under 35 U.S.C. 154(b), the term of this patent shall be extended for 0 days.

(21) Appl. No.: 09/290,492

(22) Filed: Apr. 12, 1999

(30) Foreign Application Priority Data

Apr. 28, 1998 (AT) ........................................................ 709/98

(51) Int. Cl.[7] ........................................................ F16D 3/72
(52) U.S. Cl. .............................. 464/88; 464/185; 464/181; 464/80
(58) Field of Search ................................. 464/68, 61, 51, 464/181, 80, 87, 147, 173, 175, 177, 185, 79, 88; 192/212, 55.2, 207

(56) References Cited

U.S. PATENT DOCUMENTS

| | | | |
|---|---|---|---|
| 1,639,644 | * 8/1927 | Baumann | 464/88 |
| 2,895,580 | * 7/1959 | Badin | 192/212 |
| 3,404,544 | * 10/1968 | Fawick | 464/88 |
| 3,531,949 | * 10/1970 | Downey | 464/88 |
| 5,158,504 | * 10/1992 | Stocco | 464/147 |
| 5,364,309 | * 11/1994 | Heidrich et al. | 464/147 |
| 5,551,918 | * 9/1996 | Jones et al. | 464/80 |
| 5,890,965 | * 4/1999 | Deeg et al. | 464/88 |
| 6,095,924 | * 8/2000 | Geislinger | 464/80 |

* cited by examiner

Primary Examiner—Lynne H. Browne
Assistant Examiner—Kenneth Thompson
(74) Attorney, Agent, or Firm—Collard & Roe, P.C.

(57) ABSTRACT

A coupling combination (1) consists of a compensating coupling (2) and a torsionally elastic coupling (3), where the compensating coupling (2) comprises a coupling member (4) with a middle tube portion (5) and two end-face diaphragm portions (6, 7) forming connecting rings (62, 72), and the torsionally elastic coupling (3) has an inner portion (10) and an outer portion (11) and between outer portion (11) and inner portion (10) has spring elements (12) for torque transmission. To achieve a rather short overall length, the tube portion (5) of the coupling member (4) is divided along an axially normal parting plane (T) in two tube sections (51, 52) to be screwed together via outwardly protruding flange edges (8, 9), at least one of the diaphragm portions (6, 7) is attached at the associated tube section (51, 52) in the outer peripheral region (61, 71) and forms the connecting ring (62, 72) in its inner peripheral region, and the torsionally elastic coupling (3) is provided in the vicinity of this tube section (51, 52) inside the coupling member (4), where the connecting ring (62, 72) of the diaphragm portion (6, 7) is each screwed to the outer portion (11) of the torsionally elastic coupling (3), and the inner portion (10) coaxially extends through the connecting ring (62, 72) to the outside.

4 Claims, 3 Drawing Sheets

Figure 1:
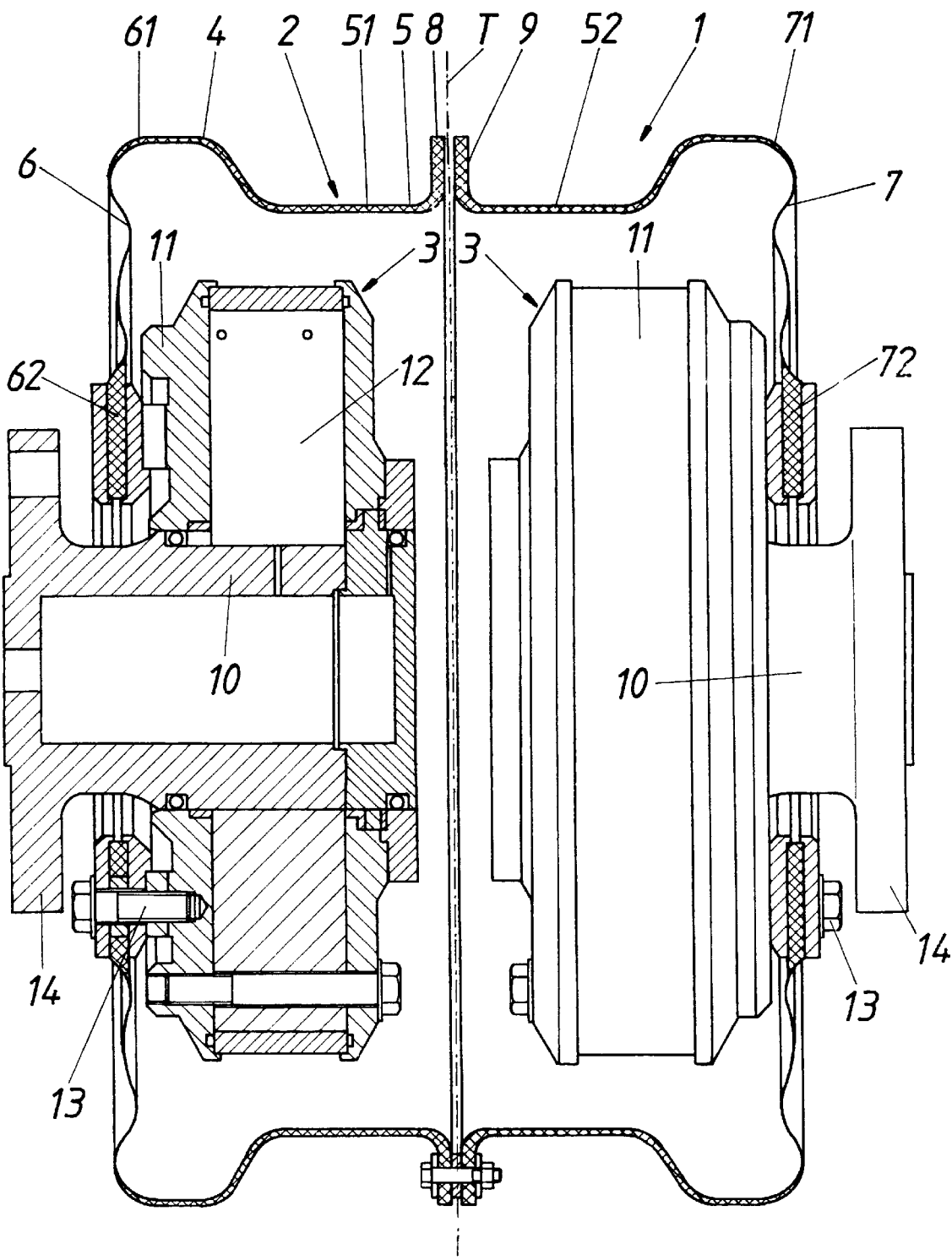

COUPLING COMBINATION OF A COMPENSATING COUPLING AND A TORSIONALLY ELASTIC COUPLING

This invention relates to a coupling combination of a compensating coupling and a torsionally elastic coupling, wherein the compensating coupling comprises a coupling member with a middle tube portion and two end-face connecting rings to be incorporated in diaphragm portions constituting a torque-transmitting drive connection, and the torsionally elastic coupling has an inner portion and an outer portion, and between outer portion and inner portion spring elements for torque transmission.

Compensating couplings with diaphragm-fitted coupling members not only ensure a perfect torque transmission due to their torsional resistance, but due to the deformability of their diaphragm portions also provide for a compensation of radial, axial and angular displacements of the drive portions to be coupled with each other, where depending on the requirements different shapes of diaphragms and tube portions are possible, and the tube portions and the diaphragm portions mostly consist of heavy-duty fiber composites and can be prefabricated as single parts or can be produced as uniform coupling members. In accordance with AT 403.837 B it is also already known in these coupling members to attach both diaphragm portions at the tube portion in the outer peripheral region, and to provide the connecting edges in the inner peripheral region, so as to be able to dimension the diaphragm portions large enough in adaptation to the desired requirements as regards the working elasticity. These compensating couplings are optimally suited for connecting turbines, elastically mounted motors, propellers or the like with the drive train, where, in order to keep critical resonances out of the operating speed range and possibly dampen other vibration phenomena, torsionally elastic or torsionally elastic and vibration-damping couplings are incorporated in the drive train in addition to the compensating coupling. For this purpose, the compensating coupling and the torsionally elastic coupling have so far been axially disposed one beside the other, and the connecting ring of the one diaphragm portion of the compensating coupling is screwed to the inner or outer portion of the adjoining torsionally elastic coupling directly or via an intermediate flange. However, this coexistence of compensating coupling and torsionally elastic coupling involves a comparatively large overall length, which in the case of cramped space conditions often leads to considerable difficulties during the installation and removal of the coupling combination.

It is therefore the object underlying the invention to create a coupling combination as described above, which with a perfect torque transmission and offset compensation behavior is characterized by its minimized overall length and its favorable installation and removal conditions.

This object is solved by the invention in that the tube portion of the coupling member of the compensating coupling is divided in a manner known per se along an axially normal parting plane in two tube sections to be screwed together via outwardly protruding flange edges, that at least one of the diaphragm portions of the coupling member is attached at the associated tube portion in its outer peripheral region and forms the connecting ring in its inner peripheral region, and that the torsionally elastic coupling is disposed in the vicinity of this tube section inside the coupling member, where the connecting ring of the diaphragm portion is screwed to the outer portion of the torsionally elastic coupling and the inner portion coaxially extends through the connecting ring to the outside. As a result, the torsionally elastic coupling can be fully integrated in the compensating coupling, and the required working length of the compensating coupling substantially also determines the total length of the entire coupling combination. Since the tube portion is divided in two tube sections, the torsionally elastic coupling can not only easily be inserted inside the compensating coupling, but the entire coupling combination can be mounted and dismounted economically by means of an installation and removal section by section even if little space is available in the vicinity of the drive train. As required, the torsionally elastic coupling can be fixed with the diaphragm portion of the compensating coupling at the driving end or at the driven end, where for connecting the coupling combination to the adjacent parts of the drive train in the vicinity of the torsionally elastic coupling the inner portion thereof is used in the usual way, whereas in the vicinity of the free diaphragm portion of the compensating coupling the connecting ring thereof is used. Despite the compact design and the different types of coupling integrated with each other there is a clear separation of the coupling functions, where the compensating coupling performs the required compensating movements, but the torsionally elastic coupling, which may of course also be designed as vibration-damping coupling, must only absorb the loads due to the torsional vibrations.

It may be advantageous when both diaphragm portions of the coupling member are attached at the associated tube sections in the outer peripheral region, and in the inner peripheral region form the connecting rings, and when inside both tube sections there is each provided a torsionally elastic coupling, as in this way the compensating coupling is combined with two torsionally elastic couplings connected in series and it is possible to allocate a torsionally elastic coupling both to the motor side and to the transmission side. The installation of the coupling combination in the drive train is effected on both sides via the inner portions of the torsionally elastic couplings, and the total length of the coupling is in turn substantially determined by the working length of the compensating coupling.

A further constructional variant is obtained in that the one diaphragm portion of the coupling member is attached at the associated tube section in the outer peripheral region, and the other diaphragm portion is attached at the associated tube section in the inner peripheral region, and the one diaphragm portion forms the connecting ring in the inner peripheral region and the other diaphragm portion forms the connecting ring in the outer peripheral region, where the tube sections having different diameters are screwed together via flange edges of different sizes, which compensate the difference in diameter. In this case, the torsionally elastic coupling is incorporated in the tube section attached in the outer peripheral region of the one diaphragm portion, where the inner portion of the torsionally elastic coupling makes the connection to the adjoining drive train, whereas the other tube section is attached in the inner peripheral region of the other diaphragm portion, and this diaphragm portion has the connecting ring in the outer peripheral region, so that here a direct connection to correspondingly large-diameter components, for instance a flywheel or the like, can be effected in the outer peripheral region. In addition, the small-diameter tube section provides a good accessibility and thus improved assembly conditions for screwing the flange edges on the one hand and the outer connecting rings on the other hand.

It is furthermore advantageous when in the inner peripheral region of the diaphragm portions or in the vicinity of the tube section having a smaller diameter aeration holes are provided, and in the vicinity of the flange edges vent holes are provided, so that in the case of a rotation of the coupling the coupling member acts as ventilator and ensures a perfect dissipation of heat from the inner region of the coupling combination.

Figure 2:
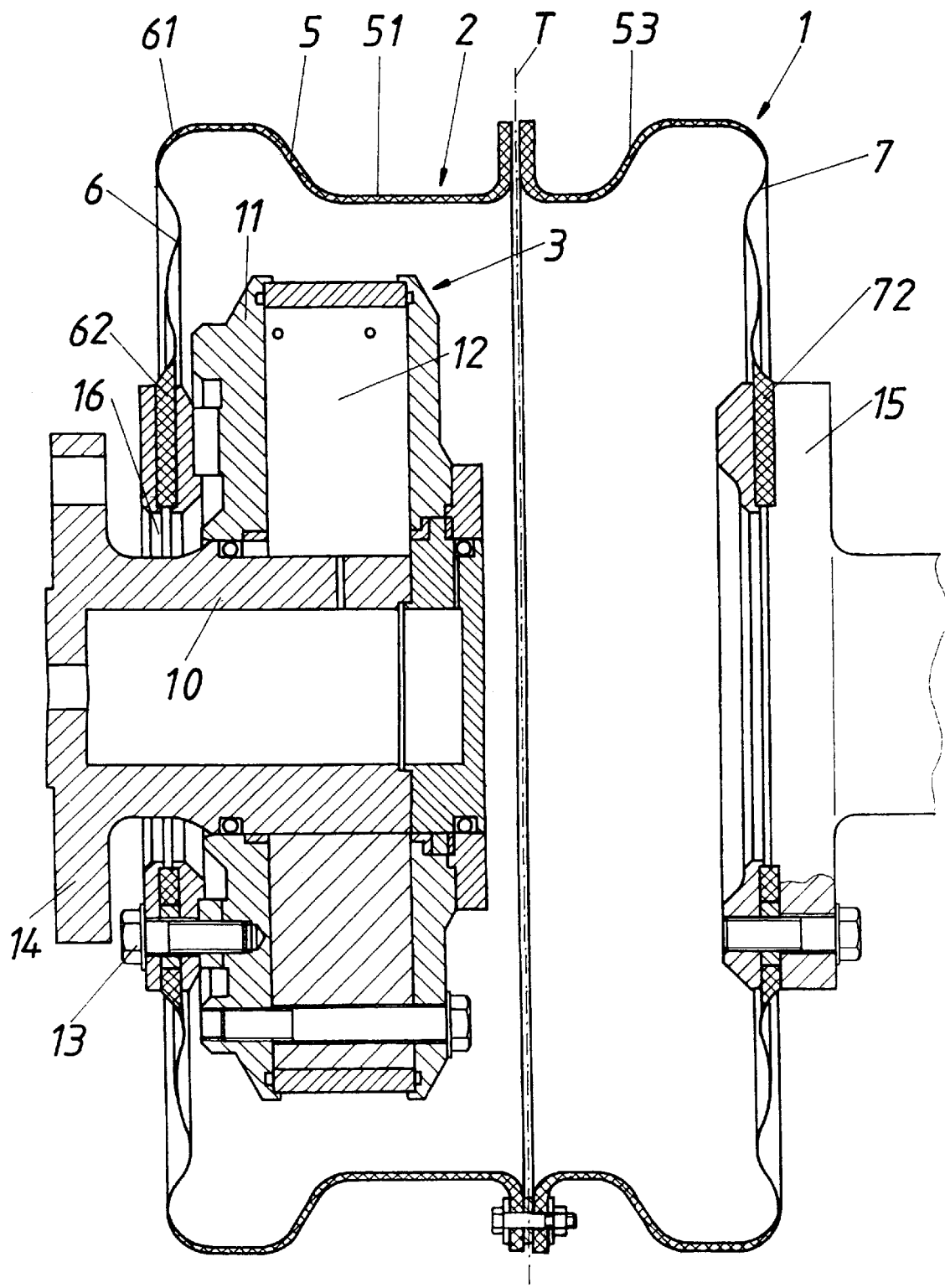
Figure 3:
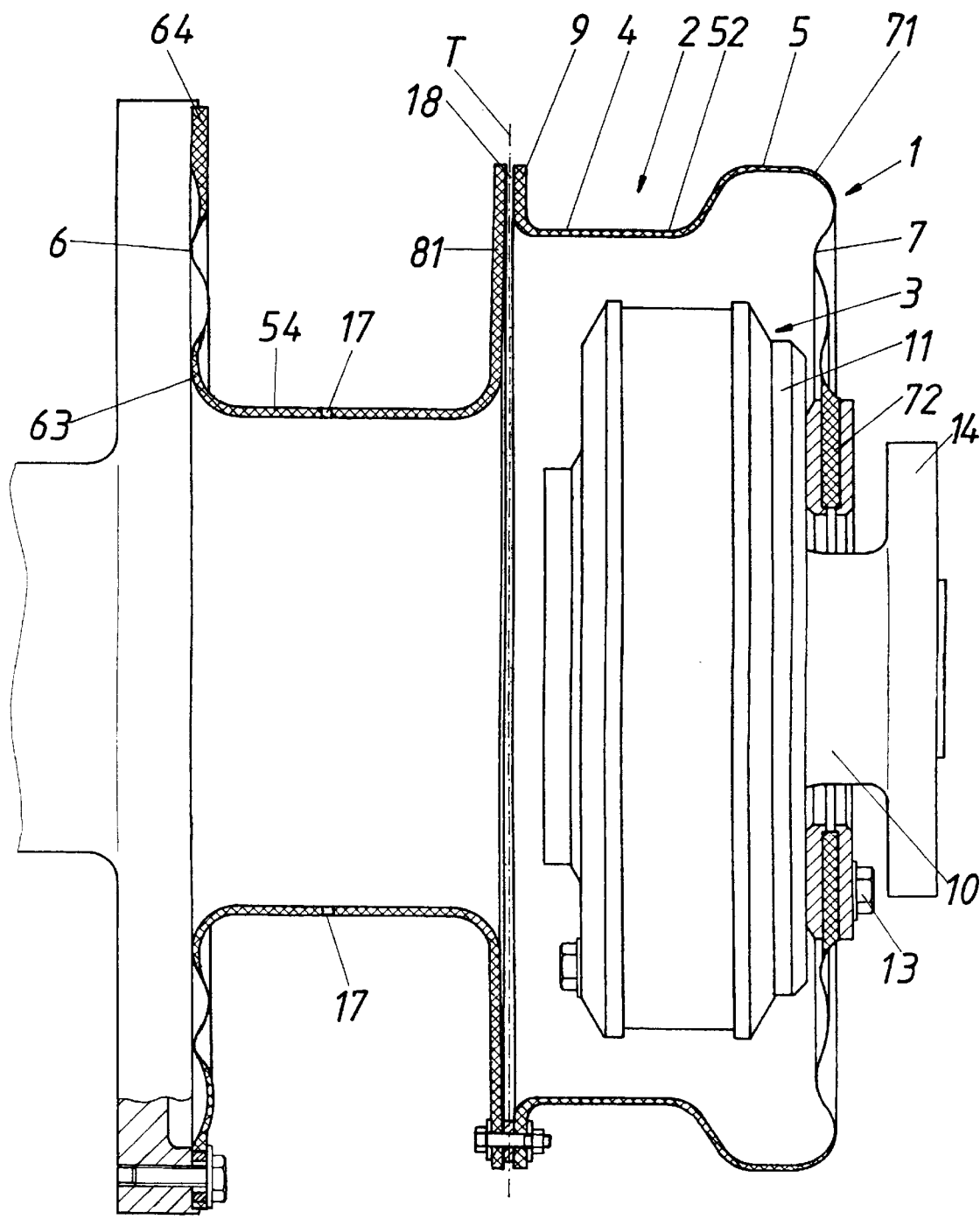

In the drawing, the subject-matter of the invention is illustrated purely schematically, wherein FIGS. 1, 2 and 3 show three different embodiments of an inventive coupling combination, each in an axial section.

In accordance with the embodiment shown in FIG. 1, the coupling combination 1 consists of a compensating coupling 2 and two torsionally elastic couplings 3, where in the compensating coupling comprises a coupling member 4 with a middle tube portion 5 and two end-face diaphragm portions 6, 7. The tube portion 5 is divided in two tube sections 51, 52 along an axially normal parting plane T, which tube sections are screwed together via outwardly protruding flange edges 8, 9. The diaphragm portions 6, 7 of the coupling member 4 are each attached at the associated tube section 51, 52 in the outer peripheral region 61, 71 and form connecting rings 62, 72 in the inner peripheral regions.

The two torsionally elastic couplings 3 each have an inner portion 10 and an outer portion 11 as well as spring elements 12 inserted between outer portion and inner portion for torque transmission, where the two torsionally elastic couplings 3 are disposed inside the coupling member 4 in the vicinity of the tube sections 51, 52, and the connecting rings 62, 72 of the diaphragm portions 6, 7 are screwed to the outer portion 11 of the torsionally elastic couplings 3 via fastening screws 13. The inner portions 10 of the couplings 3 coaxially extend through the connecting rings 62, 72 out of the coupling combination 1 and are equipped with connecting flanges 14 for incorporation in a torque-transmitting drive connection.

In accordance with the embodiment shown in FIG. 2, the coupling combination 1 is composed of a compensating coupling 2 and only one torsionally elastic coupling 3 with substantially the same structure, where the torsionally elastic coupling 3 is disposed inside the coupling member 4 in the vicinity of the one tube section 51. The tube section 51 enclosing the torsionally elastic coupling 3 verges in the diaphragm portion 6 in the outer peripheral region 61, the inner flange ring 61 of the diaphragm portion again being screwed to the outer portion 11 of the torsionally elastic coupling 3, where the inner portion 14 coaxially extends through the connecting ring 61 out of the coupling combination 1. The other tube section 53 has a shorter axial dimension since there is no torsionally elastic coupling, and the connecting ring 72 of the diaphragm portion 7 attached at the tube section 53 in the outer peripheral region in turn serves for connection to an only indicated shaft flange 15 of the drive train.

In accordance with the embodiment shown in FIG. 3, the coupling combination 1 likewise consists of a compensating coupling 2 and only one torsionally elastic coupling 3, where the tube section 52 of the coupling member 4, which accommodates the torsionally elastic coupling 3, is attached at the associated diaphragm portion 7 in the outer peripheral region 71, which diaphragm portion 7 with its connecting ring 72 provided in the inner peripheral region is screwed to the outer portion 11 of the torsionally elastic coupling 3. The other tube section 54 is attached in the inner peripheral region 63 of the diaphragm portion 6, which diaphragm portion 6 forms the connecting ring 64 in the outer peripheral region, which provides for a connection of the coupling combination 1 having a large diameter, for instance to a flywheel or the like disposed at the motor. Since the tube section 54 has a smaller diameter than the tube section 52, the two tube sections 54, 52 are equipped with flange edges 81, 9 of different sizes for mutual connection, so that the difference in diameter of the tube sections can be compensated.

For cooling the coupling combination 1 aeration holes 16, 17 are provided in the inner peripheral region of the diaphragm portion 6 or in the vicinity of the tube section 54 having a smaller diameter, and vent holes 18 are provided in the vicinity of the flange edges 8, 81, 9, for instance by means of gaps between the individual screw connections, so that the coupling combination 1 itself acts as ventilator and sucks cooling air through the compensating coupling.

What is claimed is:

1. A coupling combination of a compensating coupling and a torsionally elastic coupling, wherein the compensating coupling comprises a coupling member with a middle tube portion and two end-face connecting rings for incorporation in diaphragm portions constituting a torque-transmitting drive connection, and the torsionally elastic coupling has an inner portion and an outer portion and between outer portion and inner portion spring elements for torque transmission, characterized in that the tube portion (5) of the coupling member (4) of the compensating coupling (2) is divided in an axially normal parting plane (T) in two tube sections (51, 52, 53, 54) to be screwed together via outwardly protruding flange edges (8, 81, 9), that at least one of the diaphragm portions (6, 7) of the coupling member (4) is attached at the associated tube section (51, 52) in the outer peripheral region (61, 71) and forms the connecting ring (62, 72) in its inner peripheral region, and that the torsionally elastic coupling (3) is disposed in the vicinity of this tube section (51, 52) inside the coupling member (4), where the connecting ring (62, 72) of the diaphragm portion (6, 7) is screwed to the outer portion (11) of the torsionally elastic coupling (3), and the inner portion (10) coaxially extends through the connecting ring (62, 72) to the outside.

2. The coupling combination as claimed in claim 1, characterized in that both diaphragm portions (6, 7) of the coupling member (4) are attached at the associated tube sections (51, 52) in the outer peripheral region and form connecting rings (62, 72) in their inner peripheral regions, and that inside both tube sections (51, 52) there is each provided a torsionally elastic coupling (3).

3. The coupling combination as claimed in claim 1, characterized in that the one diaphragm portion (7) of the coupling member (4) is attached at the associated tube section (52, 54) in the outer peripheral region (71), and the other diaphragm portion (6) is attached at the associated tube section (52, 54) in the inner peripheral region (63), and the one diaphragm portion (7) forms the connecting ring (72, 64) in the inner peripheral region, and the other diaphragm portion (6) forms the connecting ring (72, 64) in the outer peripheral region, where the tube sections (52, 54) having different diameters are screwed together via flange edges (81, 9) of different sizes, which compensate the difference in diameter.

4. The coupling combination as claimed in any of claim 1, characterized in that in the inner peripheral region of the diaphragm portions or in the vicinity of the tube section (54) having a smaller diameter aeration holes (16, 17) are provided, and in the vicinity of the flange edges (8, 81, 9) vent holes (18) are provided.

* * * * *